(12) United States Patent
Wu et al.

(10) Patent No.: US 11,451,626 B2
(45) Date of Patent: Sep. 20, 2022

(54) ON DEMAND NETWORK-BASED REPLICATION AGENT

(71) Applicant: Huawei Technologies Co., Ltd., Shenzhen (CN)

(72) Inventors: Ning Wu, Northborough, MA (US); Hongliang Tang, Hopkinton, MA (US); Vadim Longinov, Marlborough, MA (US); Xiali He, Upton, MA (US)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/303,566

(22) Filed: Jun. 2, 2021

(65) Prior Publication Data
US 2021/0297486 A1 Sep. 23, 2021

Related U.S. Application Data

(63) Continuation of application No. PCT/CN2019/083330, filed on Apr. 19, 2019.
(Continued)

(51) Int. Cl.
*H04L 67/1095* (2022.01)

(52) U.S. Cl.
CPC .................. *H04L 67/1095* (2013.01)

(58) Field of Classification Search
None
See application file for complete search history.

(56) References Cited

U.S. PATENT DOCUMENTS 7,051,052 B1 * 5/2006 Shapiro ............... G06F 11/2071
707/610
7,145,898 B1 * 12/2006 Elliott .................... H04L 12/66
370/352
(Continued)

FOREIGN PATENT DOCUMENTS

CN 102629946 A 8/2012
CN 105897653 A 8/2016
(Continued)

OTHER PUBLICATIONS

"International Application No. PCT/CN2019/083330, International Search Report and Written Opinion dated Aug. 28, 2019", (dated Aug. 28, 2019), 7 pgs.

*Primary Examiner* — Davoud A Zand
(74) *Attorney, Agent, or Firm* — Schwegman Lundberg & Woessner, P.A.

(57) ABSTRACT

A computer-implemented method for on-demand data replication in a network architecture includes activating an on-demand program to pair a network-based replication agent with a data source. Compute resources for the replication agent are allocated based on one or more hints received from the data source. The one or more hints are indicative of at least a size of an upcoming data traffic transmission from the data source. Upon receiving data from the data traffic transmission, the replication agent is activated via the on-demand program to replicate the received data using the allocated replication resources. The allocated compute resources are released upon completion of data replication of the received data. The on-demand program is a serverless function configured to activate the replication agent on-demand, upon receiving the data from the data traffic transmission.

20 Claims, 10 Drawing Sheets

Related U.S. Application Data

(60) Provisional application No. 62/777,658, filed on Dec. 10, 2018.

(56) References Cited

U.S. PATENT DOCUMENTS

| | | | |
|---|---|---|---|
| 7,263,537 B1 * | 8/2007 | Lin | G06F 16/2308 |
| | | | 707/639 |
| 9,195,564 B2 * | 11/2015 | Coleman | H04L 67/02 |
| 10,095,543 B1 * | 10/2018 | Griffin | G06F 12/128 |
| 10,255,143 B2 * | 4/2019 | Vijayan | G06F 3/0641 |
| 10,474,547 B2 * | 11/2019 | McAlister | G06F 11/2094 |
| 10,592,357 B2 * | 3/2020 | Vijayan | G06F 3/065 |
| 10,623,429 B1 * | 4/2020 | Vines | H04L 41/14 |
| 2014/0259168 A1 * | 9/2014 | McNamee | H04L 63/145 |
| | | | 726/23 |
| 2016/0283274 A1 * | 9/2016 | Kochunni | G06F 9/5022 |
| 2017/0102969 A1 * | 4/2017 | Kochunni | G06F 3/067 |

FOREIGN PATENT DOCUMENTS

| | | |
|---|---|---|
| WO | WO-2018072450 A1 | 4/2018 |
| WO | WO-2020119000 A1 | 6/2020 |

* cited by examiner

ON DEMAND NETWORK-BASED REPLICATION AGENT

CROSS-REFERENCE TO RELATED APPLICATIONS

This application is a continuation application of International Application No. PCT/CN2019/083330, filed Apr. 19, 2019, which claims the benefit of priority to U.S. Provisional Application 62/777,658, filed Dec. 10, 2018, and entitled "On-demand Network-Based Replication Agent," the benefit of priority of each of which is claimed herein, and which applications and publication are hereby incorporated herein by reference in their entirety.

TECHNICAL FIELD

The present disclosure is related to data replication technologies. Some aspects relate to an on-demand network-based replication agent.

BACKGROUND

Data replication is the process of generating a backup (or a copy) of data from one network environment to another, or within the same network environment. Data replication technology is an important tool in many disaster recovery scenarios, where it is essential to restore a technology environment, including its software and other data assets, and reestablish network viability after a disaster incident within a network-based infrastructure. Conventional replication agents are constantly running as, for example, virtual machines. The running cost of conventional replication agents, therefore, is a long-term cost and a cost-efficient replication agent is desirable to increase data replication efficiency.

SUMMARY

Various examples are now described to introduce a selection of concepts in a simplified form that is further described below in the detailed description. The Summary is not intended to identify key or essential features of the claimed subject matter, nor is it intended to be used to limit the scope of the claimed subject matter.

According to a first aspect of the present disclosure, there is provided a computer-implemented method for on-demand data replication in a network architecture. The method includes activating an on-demand program to pair a network-based replication agent with a data source. Compute resources of the network architecture are allocated for a replication agent based on a hint received from the data source. The hint is indicative of at least a size of an upcoming data traffic transmission from the data source. In response to receiving data from the data traffic transmission, the network-based replication agent is activated via the on-demand program to replicate the received data using the allocated compute resources. The allocated compute resources are released upon completion of data replication of the received data.

In a first implementation form of the method according to the first aspect as such, the on-demand program is a serverless function configured to activate the network-based replication agent on-demand, in response to receiving the data from the data traffic transmission.

In a second implementation form of the method according to the first aspect as such or any preceding implementation form of the first aspect, the hint is indicative of at least one of the following: a start-of-data cycle indicator, an end-of-data cycle indicator, and a number of bytes within the upcoming data traffic transmission.

In a third implementation form of the method according to the first aspect as such or any preceding implementation form of the first aspect, the allocating of the compute resources of the network architecture is further based on one or both of the following: historical resource usage by the network-based replication agent and pricing information for usage of the compute resources.

In a fourth implementation form of the method according to the first aspect as such or any preceding implementation form of the first aspect, the hint includes a start-of-cycle hint comprising a start cycle indicator for the upcoming data traffic transmission.

In a fifth implementation form of the method according to the first aspect as such or any preceding implementation form of the first aspect, an end-of-cycle hint is received from the data source. The end-of-cycle hint includes an end cycle indicator of a data cycle concluding the data traffic transmission. The allocated compute resources are released based on the end cycle indicator.

In a sixth implementation form of the method according to the first aspect as such or any preceding implementation form of the first aspect, the allocating of the compute resources further includes allocating one or more of central processing unit (CPU) resources, disk space resources, and memory resources available within the network architecture to the network-based replication agent based on the one or more hints.

In a seventh implementation form of the method according to the first aspect as such or any preceding implementation form of the first aspect, another hint is received subsequent to receiving data for a first portion of the data traffic transmission. The another hint is indicative of a size of data for an upcoming second portion of the data traffic transmission.

In an eighth implementation form of the method according to the first aspect as such or any preceding implementation form of the first aspect, the allocated one or more of CPU resources, disk space resources, and memory resources are dynamically adjusted based on the another hint indicative of the size of data for the upcoming second portion of the data traffic transmission.

According to a second aspect of the present disclosure, there is provided a system including a memory that stores instructions and one or more processors in communication with the memory. The one or more processors execute the instructions to activate an on-demand program to pair a network-based replication agent with a data source. The one or more processors execute the instructions to allocate compute resources for the network-based replication agent based on a hint received from the data source. The hint is indicative of at least a size of an upcoming data traffic transmission from the data source. The one or more processors execute the instructions to activate the network-based replication agent via the on-demand program to replicate the received data using the allocated compute resources, in response to receiving data from the data traffic transmission. The one or more processors execute the instructions to release the allocated compute resources upon completion of data replication of the received data.

In a first implementation form of the system according to the second aspect as such, the on-demand program is a serverless function configured to activate the cloud-based replication agent on demand, upon receiving the data from the data traffic transmission.

In a second implementation form of the system according to the second aspect as such or any preceding implementation form of the second aspect, the hint is indicative of at least one of the following: a start-of-data cycle indicator, an end-of-data cycle indicator, and a number of bytes within the upcoming data traffic transmission.

In a third implementation form of the system according to the second aspect as such or any preceding implementation form of the second aspect, allocating the compute resources is further based on one or both of the following: historical resource usage by the network-based replication agent and pricing information for usage of the compute resources.

In a fourth implementation form of the system according to the second aspect as such or any preceding implementation form of the second aspect, the hint includes a start-of-cycle hint comprising a start cycle indicator for the upcoming data traffic transmission.

In a fifth implementation form of the system according to the second aspect as such or any preceding implementation form of the second aspect, the one or more processors execute the instructions to receive an end-of-cycle hint from the data source, the end-of-cycle hint comprising an end cycle indicator of a data cycle concluding the data traffic transmission, and release the allocated compute resources based on the end cycle indicator.

In a sixth implementation form of the system according to the second aspect as such or any preceding implementation form of the second aspect, to allocate the compute resources, the one or more processors execute the instructions to allocate one or more of central processing unit (CPU) resources, disk space resources, and memory resources for the network-based replication agent based on the one or more hints.

In a seventh implementation form of the system according to the second aspect as such or any preceding implementation form of the second aspect, the one or more processors execute the instructions to receive another hint subsequent to receiving data for a first portion of the data traffic transmission, the another hint indicative of a size of data for an upcoming second portion of the data traffic transmission.

In an eighth implementation form of the system according to the second aspect as such or any preceding implementation form of the second aspect, the one or more processors execute the instructions to dynamically adjust the allocated one or more of CPU resources, disk space resources, and memory resources based on the another hint indicative of the size of data for the upcoming second portion of the data traffic transmission.

According to a third aspect of the present disclosure, there is provided a non-transitory computer-readable medium storing instructions for on-demand data replication in a network architecture, that when executed by one or more processors, cause the one or more processors to perform operations. The operations include activating an on-demand program to pair a network-based replication agent with a data source. The operations further include allocating compute resources for the network-based replication agent based on a hint received from the data source, the hint indicative of at least a size of an upcoming data traffic transmission from the data source. The operations further include activating the network-based replication agent via the on-demand program to replicate the received data using the allocated compute resources, upon receiving data from the data traffic transmission. The operations further include releasing the allocated compute resources upon completion of data replication of the received data.

In a first implementation form of the non-transitory computer-readable medium according to the third aspect as such, where upon execution, the instructions further cause the one or more processors to perform operations including allocating one or more of central processing unit (CPU) resources, disk space resources, and memory resources for the network-based replication agent based on the one or more hints. Another hint is received subsequent to receiving data for a first portion of the data traffic transmission. The another hint is indicative of a size of data for an upcoming second portion of the data traffic transmission. The allocated one or more CPU resources, disk space resources, and memory resources are dynamically adjusted based on the at least another hint indicative of the size of data for the upcoming second portion of the data traffic transmission.

Any one of the foregoing examples may be combined with any one or more of the other foregoing examples to create a new embodiment within the scope of the present disclosure.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

DETAILED DESCRIPTION

Figure 1:
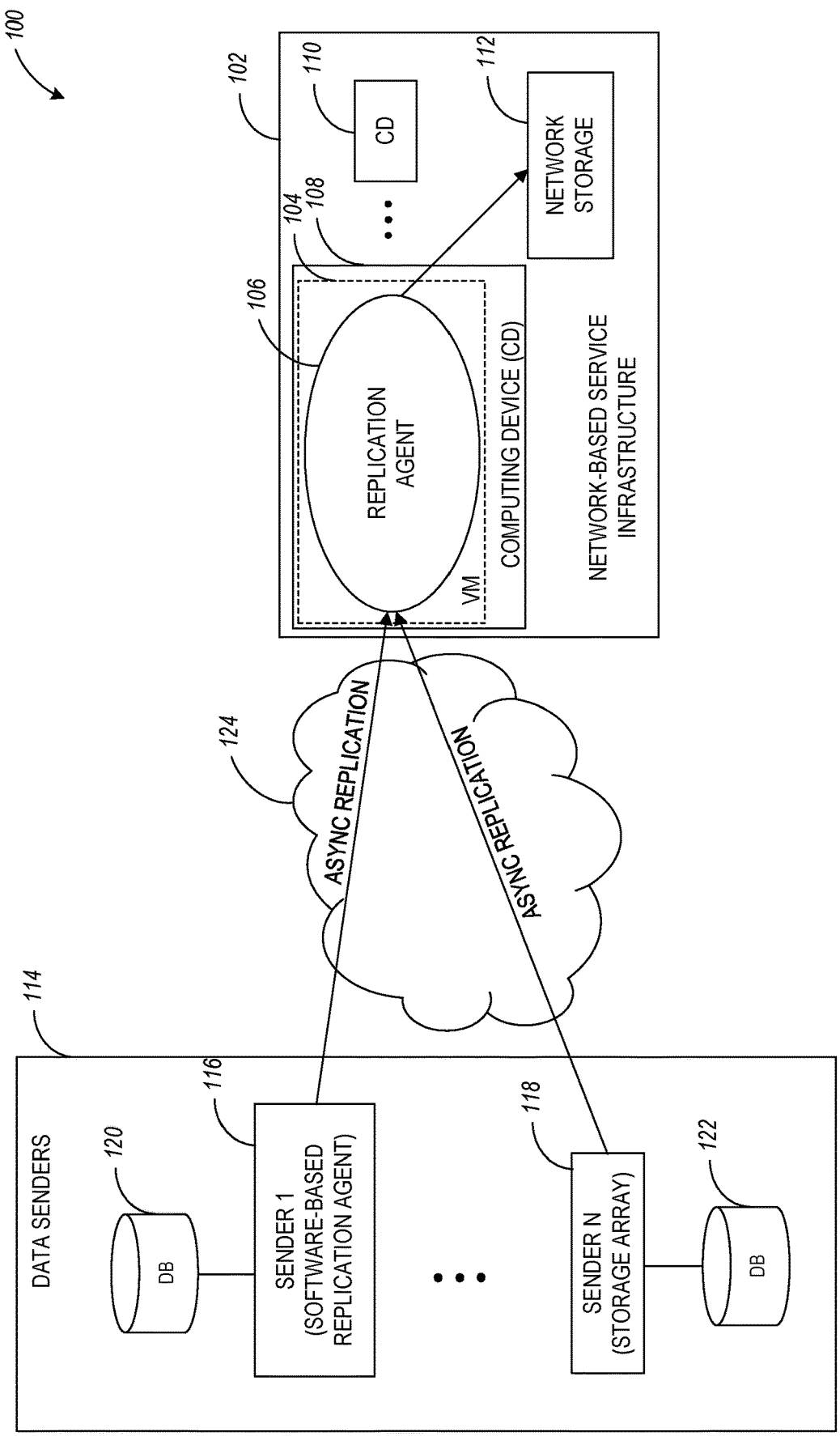
FIG. 1 is a high-level system overview of a network architecture using a conventional replication agent.

It should be understood at the outset that although an illustrative implementation of one or more embodiments is provided below, the disclosed systems and/or methods described with respect to FIGS. 1-10 may be implemented using any number of techniques, whether currently known or not yet in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In the following description, reference is made to the accompanying drawings that form a part hereof, and in which are shown, by way of illustration, specific embodiments which may be practiced. These embodiments are described in sufficient detail to enable those skilled in the art to practice the inventive subject matter, and it is to be understood that other embodiments may be utilized, and that structural, logical, and electrical changes may be made without departing from the scope of the present disclosure. The following description of example embodiments is, therefore, not to be taken in a limiting sense, and the scope of the present disclosure is defined by the appended claims.

As used herein the term "network-based service infrastructure" includes a plurality of network devices providing on-demand computing capacity (e.g., via one or more virtual machines or other virtual resources running on the network devices) and storage capacity as a service to a community of end recipients (e.g., customers of the service infrastructure), where the end recipients are communicatively coupled to the network devices within the service infrastructure via a network. The customers of the service infrastructure can use one or more computing devices (or customer devices) to access and manage the services provided by the service infrastructure via the network. The customer devices, the network, and the network-based service infrastructure can be collectively referred to as a "network architecture."

Replication technology solutions can include storage arrays that use a software-based replication agent, which can be running as a virtual machine (VM) or as a container in network-based service infrastructure and is configured to store data in network storage as data is received. Techniques disclosed herein for on-demand data replication in the network-based service infrastructure can include an initial stage where the replication agent is bootstrapped by an on-demand program (e.g., a serverless function). The bootstrapping of the replication agent can take place upon receiving a pairing request from a data source device (which can be a computing device operated by a customer of the network-based service infrastructure). By using the on-demand program, the replication agent can be triggered to perform replication on-demand, without the need for continuous running (e.g., on a virtual machine), which increases data synchronization/replication efficiency and reduces replication costs associated with data replication services offered by the network-based service infrastructure.

At a subsequent stage, the data source device can send one or more hints (e.g., information within the transmitted data replication packets) to indicate at least a size of upcoming transmission of data for replication by the replication agent. In some aspects, the network-based service infrastructure can use a resource management engine to allocate and release compute resources for use by the replication agent, based on the received one or more hints, historic resource usage data, and/or current pricing of compute resources offered to customers of the network-based service infrastructure. In some aspects, reallocation of computing resources used by the replication agent can take place periodically, e.g., whenever a new hint is received which indicates a new upcoming data transmission or a termination of current data transmission.

In difference from prior art replication solutions (which use constantly running replication agents), the techniques disclosed herein are cost-efficient in that: (a) the replication agent incurs no cost before the replication establishment as the sender-receiver relationship will be triggered and established on-demand; (b) once the relationship is established, the cost of using compute resources for each replication period is evaluated, and the resources are allocated on-demand; (c) the current scheme monitors the cost based on cost functions and charging models of the cloud provider, and then dynamically allocates compute resources on-demand with cost in consideration.

FIG. 1 is a high-level system overview of a network architecture 100 using a conventional replication agent. Referring to FIG. 1, the network architecture 100 can include a plurality of data senders 114 communicatively coupled to a network-based service infrastructure 102 via a network 124. The data senders 114 can include a plurality of computing devices (or senders) 116, . . . , 118, with each device being coupled to a corresponding database 120, . . . , 122 that includes the data to be replicated. In some aspects, the devices 116, . . . , 118 can be devices associated with customers of the network-based service infrastructure 102, with the customers using services (e.g., replication services) provided by the network-based service infrastructure 102.

The network-based service infrastructure 102 can include a plurality of computing devices 108, . . . , 110, and network storage 112. At least one of the computing devices within the infrastructure 102 (e.g., device 108) can include a replication agent 106 coupled to the network storage 112. In some aspects, each of the computing devices 116, . . . , 118 is configured to communicate with the replication agent 106 to perform data replication, such as asynchronous data replication of data received from the databases 120, . . . , 122 via the network 124. More specifically, each of the computing devices 116, . . . , 118 can include a software-based replication agent or a storage array that can be communicatively coupled to the replication agent 106 within the network-based service infrastructure 102 via the network 124.

Any of the devices or databases shown in FIG. 1 may be implemented in a general-purpose computer modified (e.g., configured or programmed) by software to be a special-purpose computer to perform the functions described herein for that machine, database, or device. As used herein, a "database" is a data storage resource that stores data structured as a text file, a table, a spreadsheet, a relational database (e.g., an object-relational database, a NoSQL database, a network or graph database), a triple store, a hierarchical data store, or any suitable combination thereof. Additionally, data accessed (or stored) via an application programming interface (API) or remote procedure call (RPC) may be considered to be accessed from (or stored in) a database. Moreover, any two or more of the devices or databases illustrated in FIG. 1 may be combined into a single machine, database, or device, and the functions described herein for any single machine, database, or device may be subdivided among multiple machines, databases, or devices.

Network 124 may be any network that enables the communication between or among machines, databases, and devices (e.g., devices 116, . . . , 118 and devices within the network-based service infrastructure 102). Accordingly, network 124 may be a wired network, a wireless network (e.g., a mobile or cellular network), or any suitable combination thereof. Network 124 may include one or more portions that constitute a private network, a public network (e.g., the Internet), or any suitable combination thereof.

In some aspects, the replication agent 106 can be constantly running, for example, as a virtual machine (VM) 104 or as a software container operating within the computing device 108. Techniques disclosed herein in connection with FIG. 2-FIG. 10 can be used to implement a replication agent within the network-based service infrastructure via a dynamically allocated resource, allowing for the replication agent to be used on-demand, with minimal operating costs (e.g., the replication agent are not triggering operating costs unless used), and with dynamically allocated compute resources for use by the replication agent.

Figure 2:
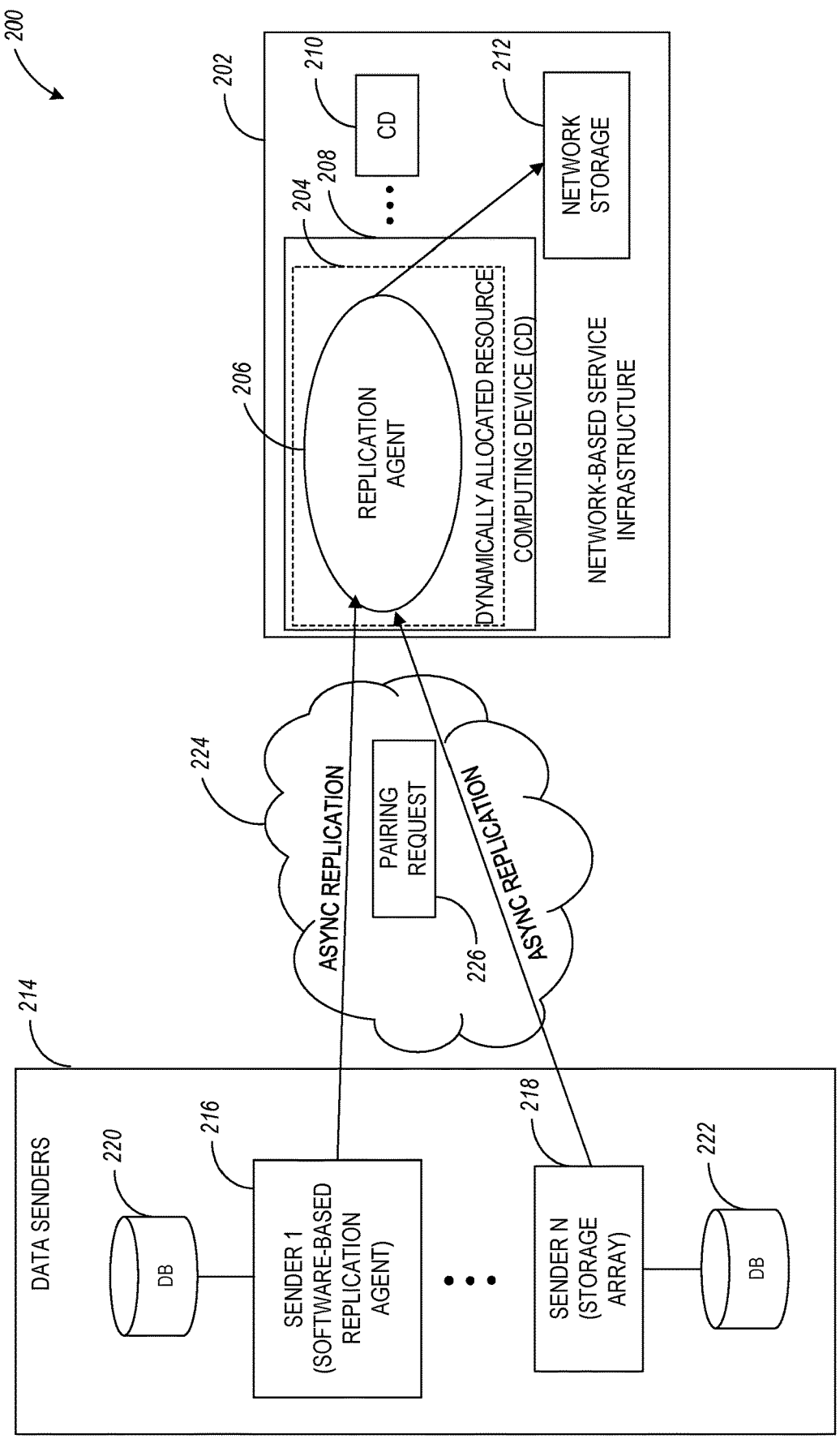
FIG. 2 is a high-level system overview of a network architecture using a replication agent running on a dynamically allocated resource within a network-based service infrastructure, according to some example embodiments.

FIG. 2 is a high-level system overview of a network architecture 200 using a replication agent 206 running on a dynamically allocated resource 204 within a network-based service infrastructure 202, according to some example embodiments. Referring to FIG. 2, the network architecture 200 can include a plurality of data senders 214 communicatively coupled to the network-based service infrastructure 202 via the network 224. The data senders 214 can include a plurality of computing devices (or senders) 216, . . . , 218, with each device being coupled to a corresponding database 220, . . . , 222 that includes, e.g., data to be replicated.

The network-based service infrastructure 202 can be similar to the network-based service infrastructure 102 of FIG. 1. More specifically, the network-based service infrastructure 202 can include a plurality of computing devices 208, . . . , 210, and network storage 212. At least one of the computing devices within the infrastructure 202 (e.g., device 208) can include a replication agent 206 coupled to the network storage 212. In some aspects, each of the computing devices 216, . . . , 218 is configured to communicate with the replication agent 206 to perform data replication, such as asynchronous data replication of data received from the databases 220, . . . , 222 via the network 224. In some aspects, each of the computing devices 216, . . . , 218 can include a software-based replication agent or a storage array that can be communicatively coupled to the replication agent 206 within the network-based service infrastructure 202 via the network 224. Network 224 can be similar to network 124 of FIG. 1.

In some aspects, the computing device 208 can use a dynamically allocated resource 204 to run the replication agent 206 for replicating data received from the senders 210 into the network storage 212. The dynamically allocated resource 204 can include a serverless function, a server-based function, or another cost-efficient mechanism provided to customers of the network-based service infrastructure 202, which mechanism can be executed on-demand and upon data communicated for replication by the data senders 210. Each of the computing devices 216, . . . , 218 is configured to communicate with the replication agent 206 to perform data replication, such as asynchronous data replication of data from the databases 220, . . . , 222. More specifically, each of the computing devices 216, . . . , 218 can include a software-based replication agent or a storage array that can be communicatively coupled to the replication agent 206 within the network-based service infrastructure 202 upon communicating a pairing request 226. The kickoff process for establishing the replication agent 206 as an on-demand replication agent is illustrated in greater detail in FIG. 3.

Figure 3:
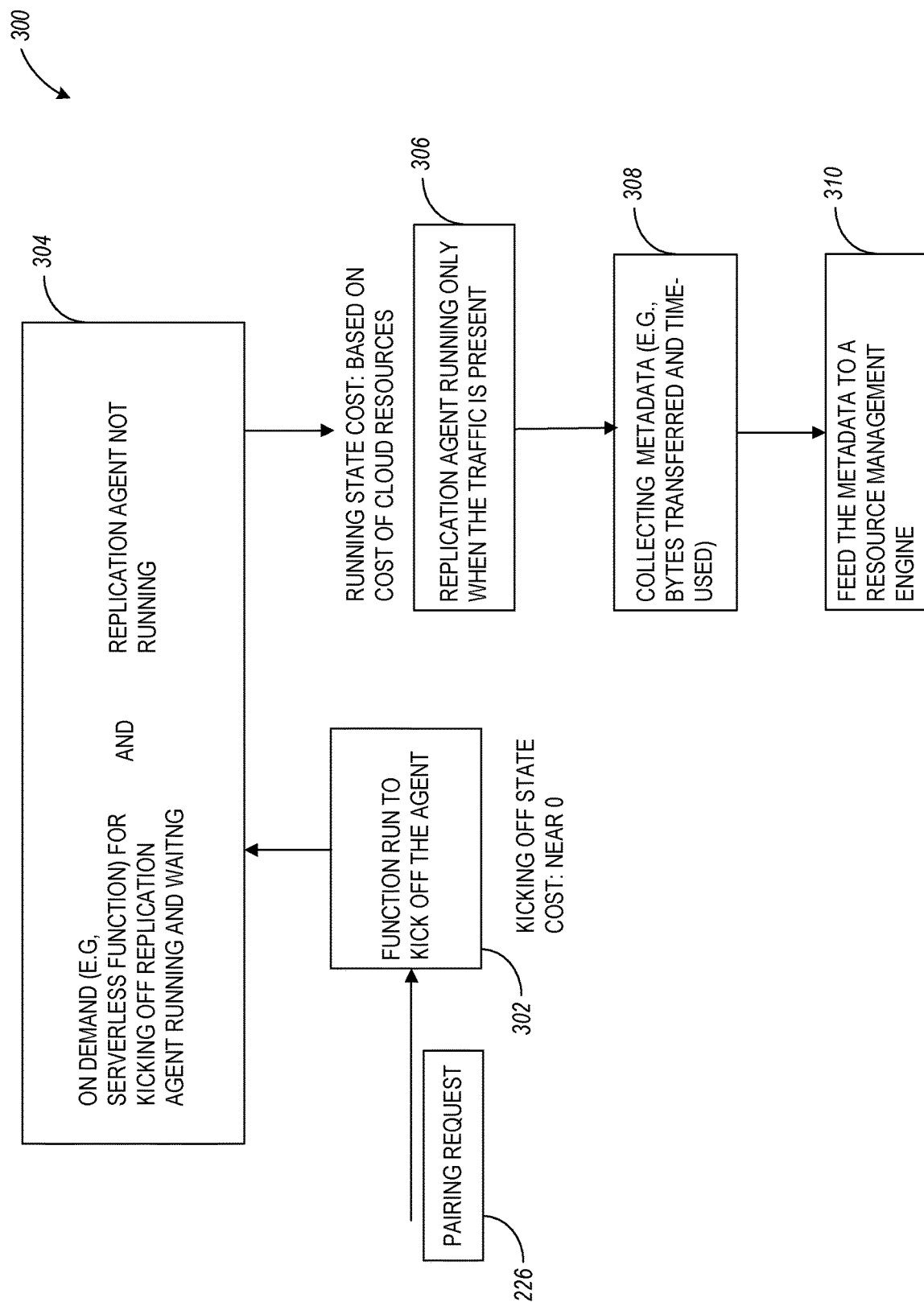
FIG. 3 is a block diagram illustrating a processing flow for establishing an on-demand replication agent, according to some example embodiments.

FIG. 3 is a block diagram illustrating processing flow 300 for establishing an on-demand replication agent, according to some example embodiments. Referring to FIG. 3, the processing flow 300 can be initiated when one or more of the computing devices 216, . . . , 218 communicates a pairing request 226 for pairing the replication agent 206 with the device sending the pairing request 226. Upon receiving the pairing request 226, the replication agent 206 can be bootstrapped by the dynamically allocated resource 204, which can include an on-demand program such as a serverless function. At operation 302, the serverless function 204 can be run to kick off the replication agent 206. The cost for kicking off the replication agent 206 to a customer of the network-based service infrastructure 202 can be minimal and near-zero since only a cost for running the serverless function is incurred by the customer.

After the replication agent 206 is kicked off at operation 302, an initial operating state 304 is established for the replication agent 206. At the initial operating state 304, the dynamically allocated resource, such as serverless function, 204 is running and waiting, while the replication agent 206 is not running and not incurring costs. The replication agent 206 can transition into a running state 306 only when data traffic for replication is communicated to the network-based service infrastructure 202 by the paired computing device from the data senders 214 which communicated the pairing request 226. In this regard, the replication agent 206 can operate on-demand, performing data replication only went data traffic is present. Additionally, and in connection with the replication agent 206, a customer of the network-based service infrastructure 202 can select the computing device 208 (or another pre-determined/selected computing resource within the network-based service infrastructure 202) to host the dynamically allocated resource 204 for running the replication agent 206 on-demand.

When data is being communicated for replication by the replication agent 206, at operation 308, various metadata can be collected from the communicated data. For example, the metadata can include the size of the replicated data (e.g., the total number of bytes transferred), a total time that the replication agent 206 was used, the type of data communicated for replication, CPU processing resources used for replicating the data, storage space used for replicating the data, and so forth. The collected metadata can be communicated to a resource management agent (e.g., 426 in FIG. 4) at operation 310 for purposes of, e.g., dynamic allocation or reallocation of computing resources for running the replication agent 206.

Figure 4:
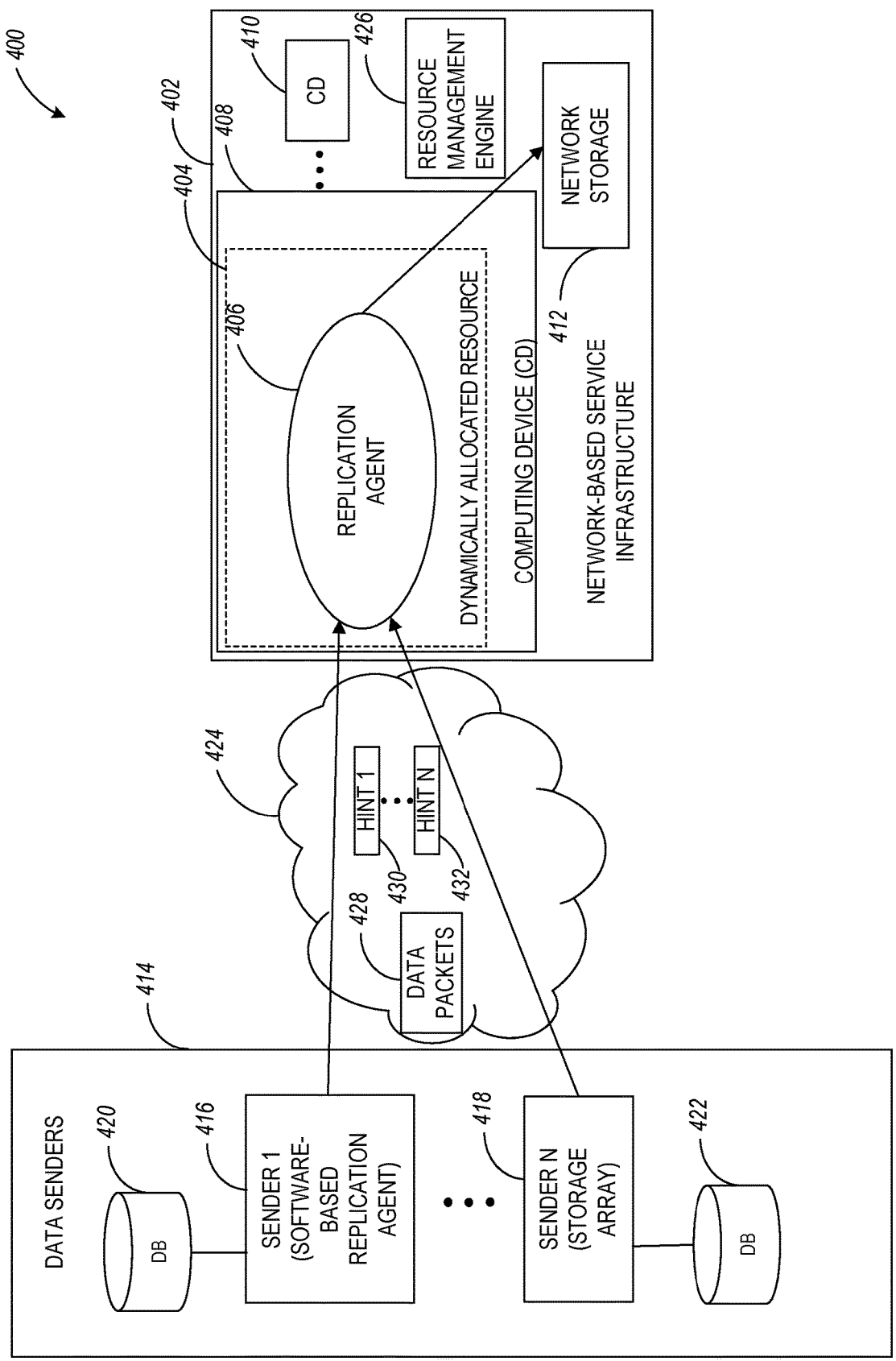
FIG. 4 is a high-level system overview of a network architecture using a replication agent with a resource management engine running within a network-based service infrastructure, according to some example embodiments.

FIG. 4 is a high-level system overview of a network architecture 400 using a replication agent 406 with a resource management engine 426 running within a network-based service infrastructure 402, according to some example embodiments. Referring to FIG. 4, the network architecture 400 can be similar to the network architecture 200 of FIG. 2 and can include a plurality of data senders 414 communicatively coupled to the network-based service infrastructure 402 via the network 424. The data senders 414 can include a plurality of computing devices (or senders) 416, . . . , 418, with each device being coupled to a corresponding database 420, . . . , 422 that includes data to be replicated.

The network-based service infrastructure 402 includes a plurality of computing devices 408, . . . , 410, network storage 412, and a resource management engine 426. The plurality of computing devices 408, . . . , 410, and the network storage 412 can be similar to the computing devices 208, . . . , 210 and the network storage 212 of FIG. 2. One or more of the plurality of computing devices 408, . . . , 410 (e.g., device 408) can be configured with a dynamically allocated resource (e.g., a serverless function) 404 for on-demand execution of the replication agent 406. In some aspects, after a data sender (e.g., one of devices 416, . . . , 418) has established a connection with the network-based service infrastructure 402 and the replication agent 406 has been bootstrapped via the serverless function 404, the data sender (e.g., device 416) can communicate one or more hints, such as hints 430, . . . , 432 within data packets 428 that are communicated to the network-based service infrastructure 402 via the network 424 for replication within the network storage 412.

As used herein, the term "hint" can refer to information that is communicated within data sent to the network-based service infrastructure for replication, where the information further describes the communicated data. For example, a hint can include information indicative of the size of an upcoming data transfer (e.g., a start-of-cycle indication, an end-of-cycle indication, several bytes to synchronize/replicate, and so forth).

The resource management engine 426 can include suitable circuitry, logic, interfaces, and/or code and can be configured to manage computing resources used by the replication agent 406 in connection with data replication. For example, the resource management engine 426 can use information from one or more of the hints 430, . . . , 432 to proactively adjust the resource allocation associated with the replication agent 406.

Figure 5:
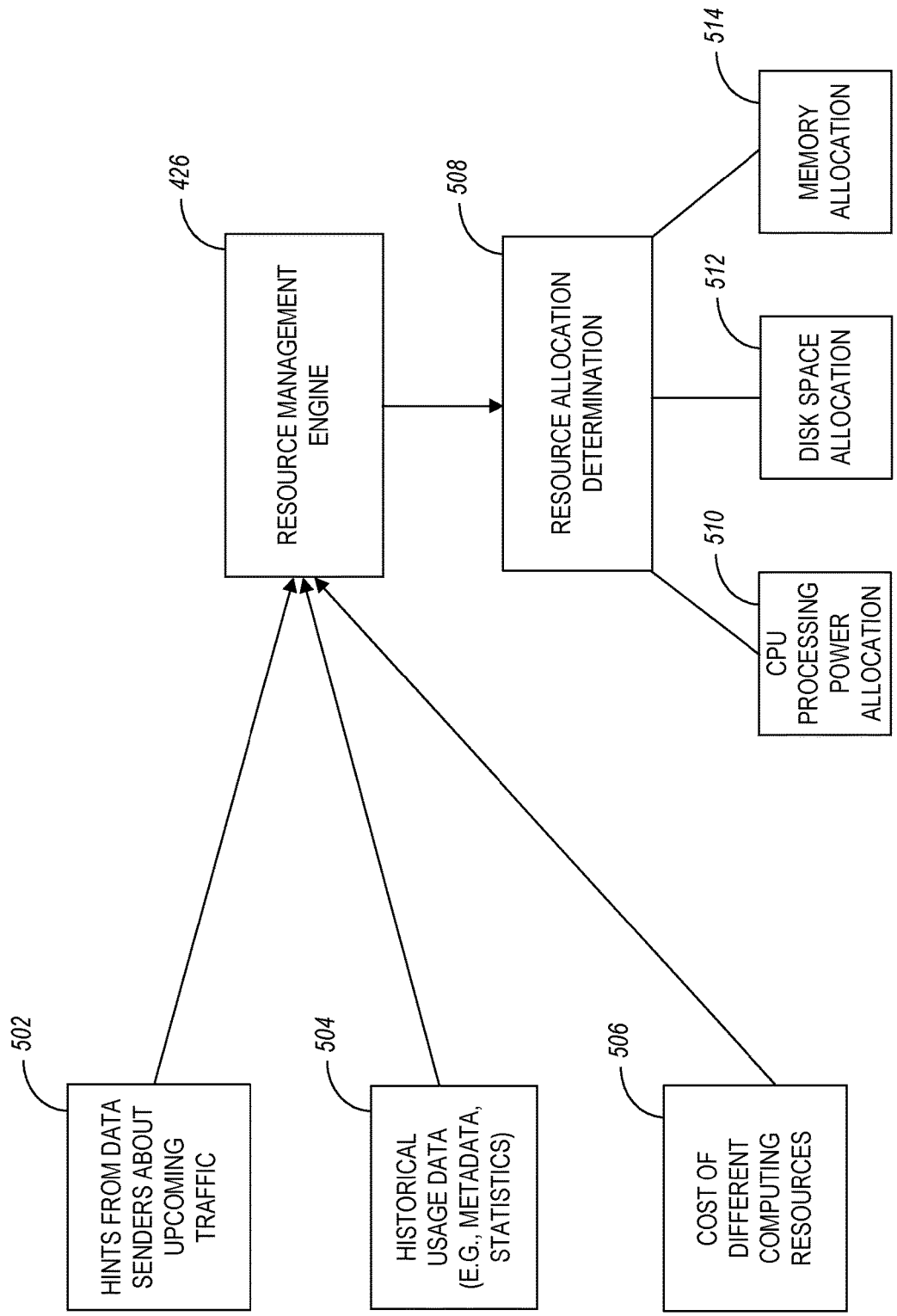
FIG. 5 is a block diagram illustrating functionalities of the resource management engine of FIG. 4 in connection with determining resource allocation, according to some example embodiments.

FIG. 5 is a block diagram illustrating functionalities of the resource management engine 426 of FIG. 4 in connection with determining resource allocation, according to some example embodiments. Referring to FIG. 5, the resource management engine 426 can use input information 502, 504, and 506 to generate a resource allocation determination 508. In some aspects, the input information 502 can include hints (e.g., hints 430, . . . , 432) communicated with data packets (e.g., data packets 428) originating from one or more of the data senders 414. The hints can provide additional information for an upcoming data traffic transmission (e.g., a start-of-cycle indicator identifying a communication cycle that will include initial packets of the upcoming data transmission) or information for a current data traffic transmission (e.g., an end-of-cycle indicator identifying a communication cycle that will include final packets of current data transmission).

In some aspects, information 504 can include historical usage data associated with previously received data that has been replicated by the replication agent 406. For example, information 504 can include the metadata collected at operation 308 in FIG. 3 or other statistical or historic data associated with prior resource usage in connection with a specific type of data or a specific amount of data that has been replicated, as well as other statistical or historic data.

In some aspects, information 506 can include cost information associated with different computing resources that are available for use by the replication agent 406 within the network-based service infrastructure 402. For example, information 506 can indicate the cost for different types of CPU processing power configurations, disk space configurations, memory configurations, and so forth. The resource management engine 426 is configured to generate a resource allocation determination 508 based on information 502, 504, and/or 506. The resource allocation determination 508 can include CPU processing power allocation 510, disk space allocation 512, and memory allocation 514, which can be used for running the dynamically allocated resource 404 and the replication agent 406.

Figure 6:
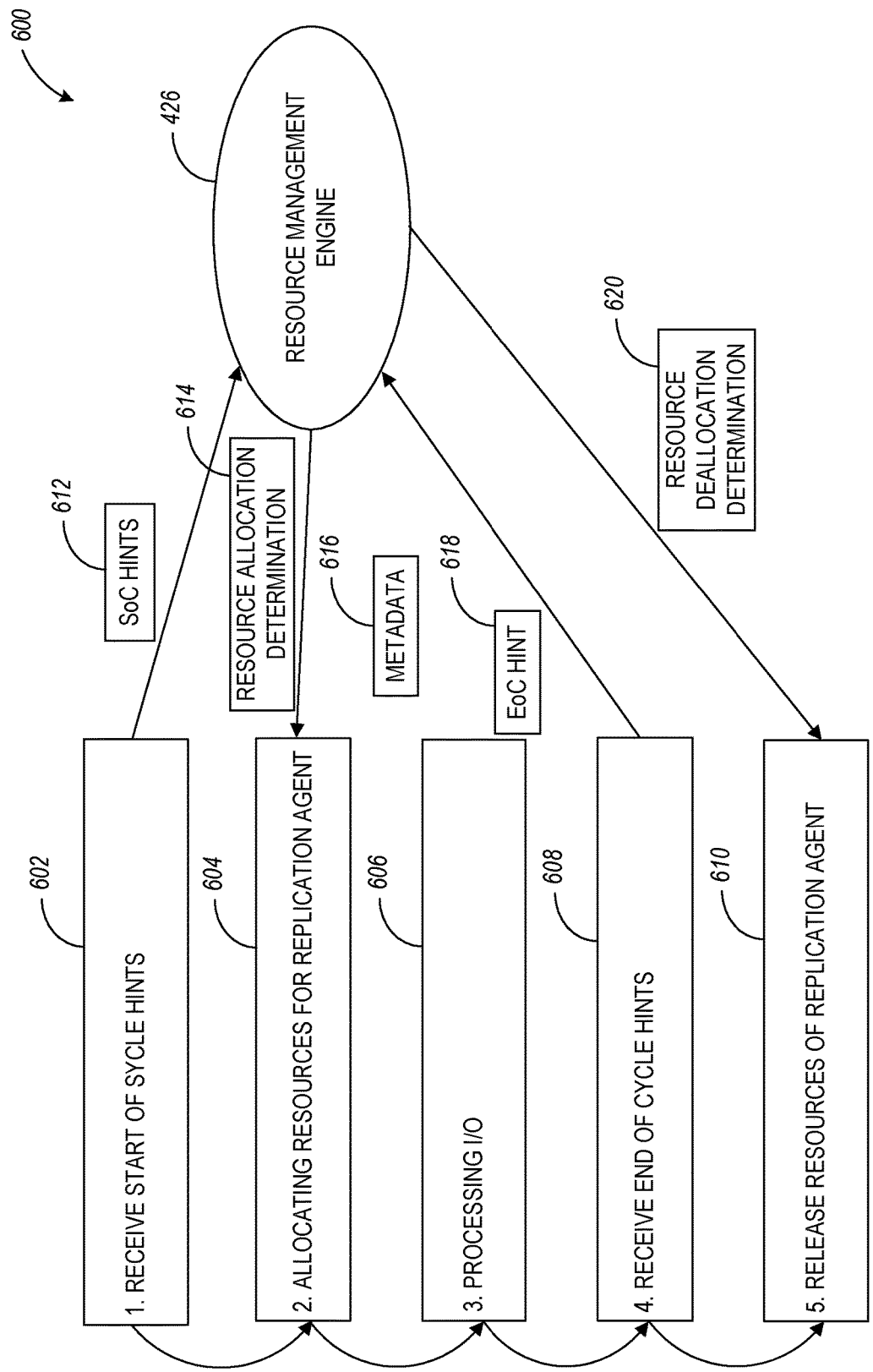
FIG. 6 is a block diagram illustrating an example on-demand data replication cycle using the resource management engine of FIG. 4, according to some example embodiments.

FIG. 6 is a block diagram illustrating an example of on-demand data replication cycle 600 using the resource management engine 426 of FIG. 4, according to some example embodiments. Referring to FIG. 6, the replication cycle 600 can start at operation 602 when a start-of-cycle hint 612 is received by the resource management engine 426. The resource management engine 426 can use the start-of-cycle hint 612 (as well as any of the additional information 504 and 506) to generate a resource allocation determination 614 for allocating resources for the replication agent 406 at operation 604. At operation 606, data can be received and replicated by the replication agent 406. At operation 608, an end-of-cycle hint 618 can be received by the resource management engine 426. During operations 606 and 608, additional metadata 616 can also be obtained in connection with data communicated for replication. Based on the end-of-cycle hint 618, the resource management engine 426 can generate resource deallocation determination 620 for releasing the computing resources used by the replication agent 406 at operation 610.

Figure 7:
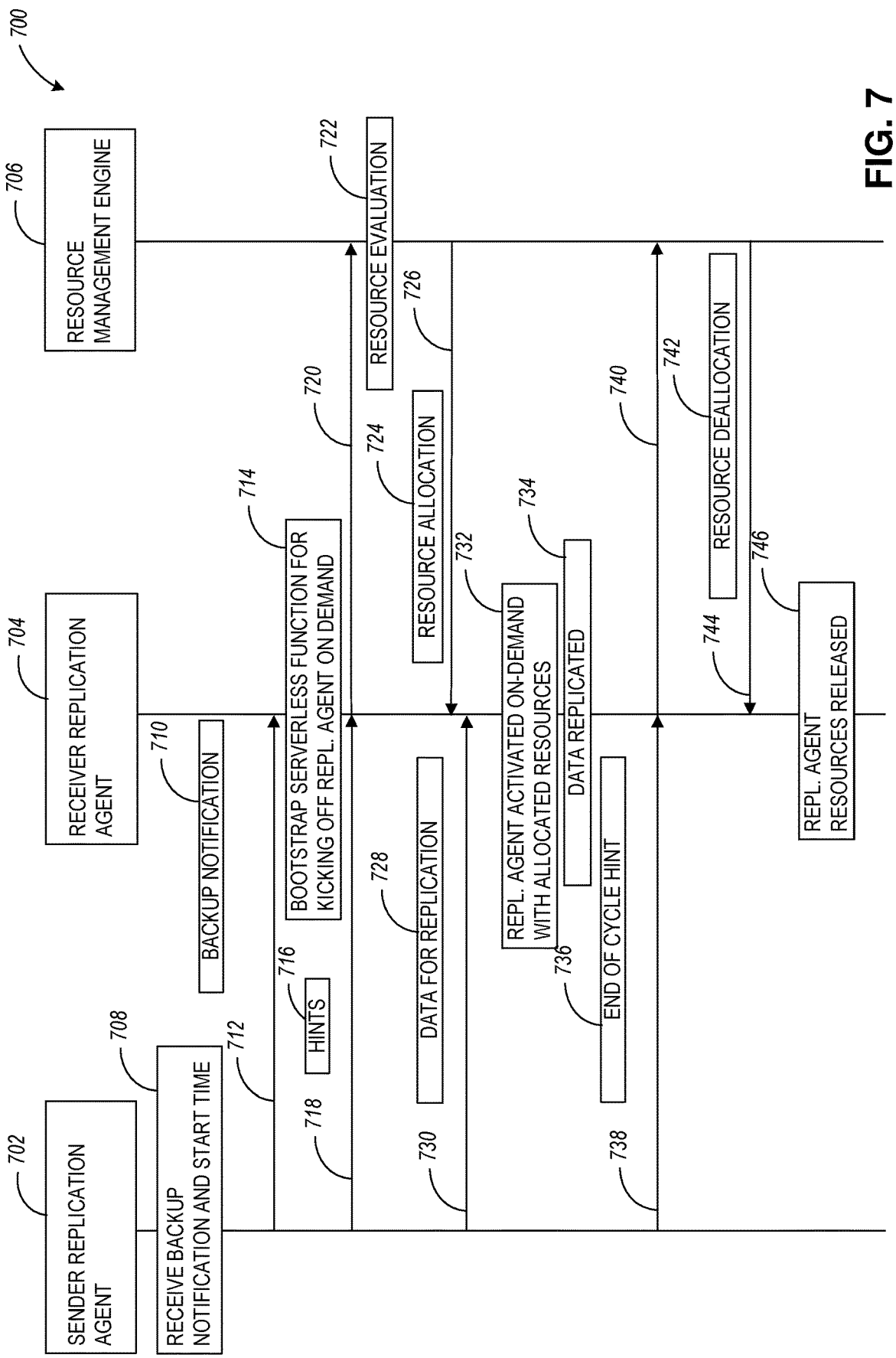
FIG. 7 is a block diagram illustrating processing flow between a sender replication agent, a receiver replication agent, and a receiver resource management engine during on-demand data replication, according to some example embodiments.

FIG. 7 is a block diagram illustrating processing flow 700 between a sender replication agent 702, a receiver replication agent 704, and a receiver resource management engine 706 during on-demand data replication, according to some example embodiments. Referring to FIG. 7, the sender replication agent 702 can be a replication agent used by one of the data sender devices 416, . . . , 418 (e.g., device 416). The receiver replication agent 704 can be the same as the replication agent 406 within the network-based service infrastructure 402, and the resource management engine 706 can be the same as the resource management engine 426 of FIG. 4.

At operation 708, the sender replication agent 702 can receive a backup notification, which can include a start time for initiating a backup of data available to the sender replication agent 702. At operation 712, a backup notification 710 (which can be based on the notification received at operation 708) is communicated to the receiver replication agent 704. In some aspects, the backup notification 710 can include a pairing request for initializing the replication agent 704. At operation 714, the receiver replication agent 704 can be bootstrapped with a dynamically allocated resource, such as a serverless function, for on-demand replication. At operation 718, hints 716 can be communicated from the sender replication agent 702 to the receiver replication agent 704. The hints 716 can include, for example, start-of-cycle indicators or other information associated with upcoming data transmission. The hints 716 can be communicated, at operation 720, to the resource management engine 706.

The resource management engine 706 can use information from the hints 716 as well as historical usage data and computing resource costs to perform computing resource evaluation at operation 722. As a result of the resource evaluation at operation 722, resource allocation determination 724 can be generated and communicated to the receiver replication agent 704 at operation 726 so that the receiver replication agent 704 can use the allocated resources during data replication. At operation 730, data 728 can be communicated to the receiver replication agent 704 for replication. At operation 732, the receiver replication agent 704 is activated via the serverless function on-demand, by receiving the data 728. At operation 734, data can be replicated by the receiver replication agent 704 using network storage, such as network storage 412 within the network-based service infrastructure 402. At operation 738, an end-of-cycle hint 736 can be communicated to the receiver replication agent 704, indicating an upcoming termination of the transmission of data 728. The received hint 736 can also be communicated to the resource management engine 706, which can generate a resource deallocation determination 742, and communicate the deallocation determination 742, at operation 744, to the receiver replication agent 704. At operation 746, the replication agent resources used by the replication agent 704 can be released based on the resource deallocation determination 742.

Figure 8:
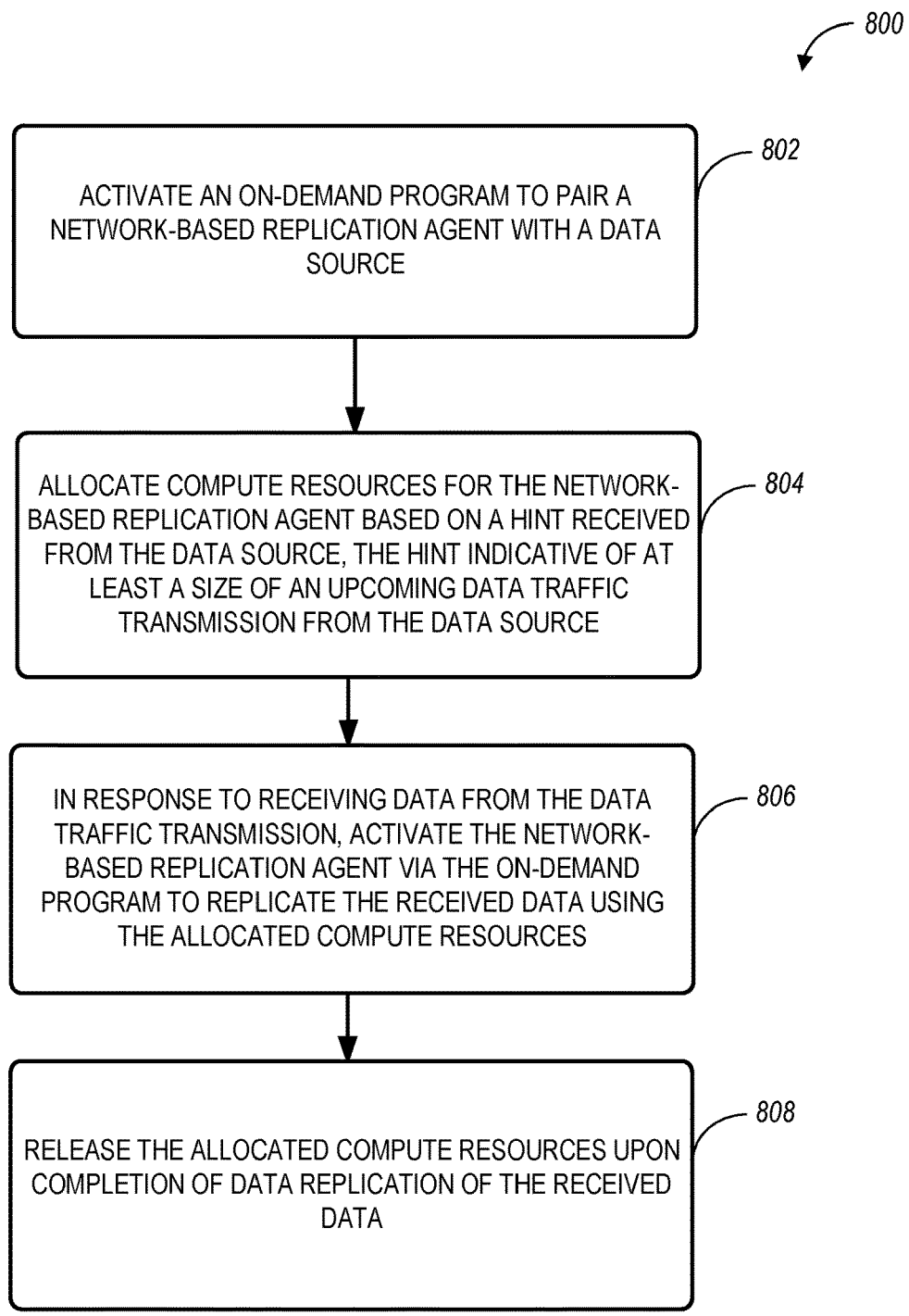
FIG. 8 is a flowchart of a method suitable for on-demand data replication in network-based service infrastructure, according to some example embodiments.

FIG. 8 is a flowchart of a method 800 suitable for on-demand data replication in network-based service infrastructure, according to some example embodiments. Method 800 includes operations 802, 804, 806, and 808. By way of example and not limitation, method 800 is described as being performed by device 408 using modules 960 and 962 of FIG. 9 (or modules 1060 and 1065 of FIG. 10). At operation 802, an on-demand program is activated to pair a network-based replication agent with a data source. For example, the dynamically allocated resource 404, which can be a serverless function, can be activated so that the replication agent 406 is paired with a data source (e.g., one or more of the data senders 414) based on a pairing request (e.g., 226). At operation 804, compute resources for the network-based replication agent are allocated based on at least one hint received from the data source. For example, the resource management engine 426 can generate a resource allocation determination of 508 based on the at least one hint (e.g., 430, . . . , 432, or 502), which can be indicative of at least a size of an upcoming data traffic transmission from the data source. At operation 806, in response to receiving data from the data traffic transmission, the network-based replication agent is activated via the on-demand program to replicate the received data using the allocated compute resources. For example, the serverless function 404 can be activated every time data is communicated from the data sender (e.g., device 416), which activates the replication agent (e.g., 406) to perform the data replication using network storage (e.g., 412). At operation 808, the allocated compute resources can be released upon completion of data replication of the received data. For example and as illustrated in FIG. 6, after the end-of-cycle hint 618 is received at operation 608, the resource management engine 426 can generate the resource deallocation determination 620 for releasing the compute resources of the replication agent 406 at operation 610.

In some aspects, the replication agent 406 can be implemented by constantly running the dynamically allocated resource 404 as a smaller scale container or a VM, which can result in paying a fixed cost when the system is idle. In this regard, when the replication agent 406 needs more resources, additional resources can be dynamically allocated to the replication agent container.

In some aspects, the hints (e.g., 416, . . . , 418) can be optional, as long as the syncing period for data replication is not changed so that the receiver (e.g., the replication agent 406) can predict when the next round of workload will be received. Additional input (e.g., heuristics information) can be used for cost reduction (e.g., scale back replication activities at certain times when the cloud computing resources are expensive).

In some aspects, the entire replication agent 406 can be run constantly as a serverless function. Depending on the price schedule offered by a cloud network provider, this technique may provide additional cost savings if serverless functions are offered at a low cost.

Figure 9:
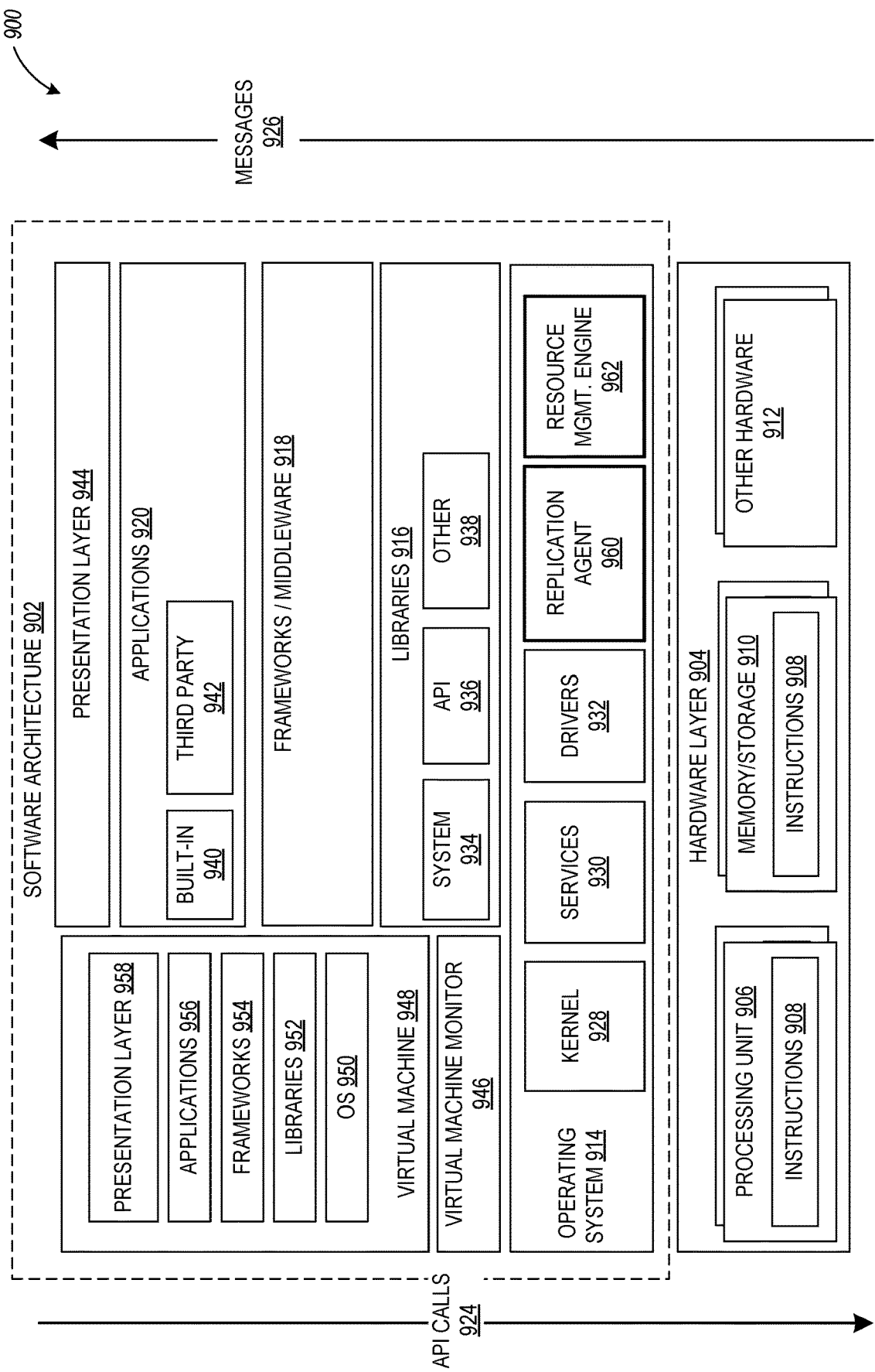
FIG. 9 is a block diagram illustrating a representative software architecture, which may be used in conjunction with various device hardware described herein, according to some example embodiments.

FIG. 9 is a block diagram illustrating a representative software architecture 900, which may be used in conjunction with various device hardware described herein, according to some example embodiments. FIG. 9 is merely a non-limiting example of software architecture 902 and it will be appreciated that many other architectures may be implemented to facilitate the functionality described herein. The software architecture 902 may be executing on hardware such as device 1000 of FIG. 10 that includes, among other things, processor 1005, memory 1010, storage 1015 and 1020, and I/O components 1025 and 1030. A representative hardware layer 904 is illustrated and can represent, for example, the device 1000 of FIG. 10. The representative hardware layer 904 comprises one or more processing units 906 having associated executable instructions 908. Executable instructions 908 represent the executable instructions of the software architecture 902, including implementation of the methods, modules, and so forth of FIGS. 1-8. Hardware layer 904 also includes memory and/or storage modules 910, which also have executable instructions 908. Hardware layer 904 may also comprise other hardware 912, which represents any other hardware of the hardware layer 904, such as the other hardware illustrated as part of device 1000.

In the example architecture of FIG. 9, the software architecture 902 may be conceptualized as a stack of layers where each layer provides particular functionality. For example, the software architecture 902 may include layers such as an operating system 914, libraries 916, frameworks/middleware 918, applications 920, and presentation layer 944. Operationally, the applications 920 and/or other components within the layers may invoke application programming interface (API) calls 924 through the software stack and receive a response, returned values, and so forth illustrated as messages 926 in response to the API calls 924. The layers illustrated in FIG. 9 are representative in nature and not all software architectures 902 have all layers. For example, some mobile or special purpose operating systems may not provide a frameworks/middleware 918, while others may provide such a layer. Other software architectures may include additional or different layers.

The operating system 914 may manage hardware resources and provide common services. The operating system 914 may include, for example, a kernel 928, services 930, drivers 932, a replication agent 960, and a resource management engine 962. The kernel 928 may act as an abstraction layer between the hardware and the other software layers. For example, kernel 928 may be responsible for memory management, processor management (e.g., scheduling), component management, networking, security settings, and so on. Services 930 may provide other common services for the other software layers. Drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

In some aspects, the replication agent 960 can be the same as the replication agent 406 discussed herein in connection with FIG. 4. The resource management engine 962 can be the same as the resource management engine 426 discussed herein in connection with FIG. 4-FIG. 6.

Libraries 916 may provide a common infrastructure that may be utilized by the applications 920 and/or other components and/or layers. Libraries 916 typically provide functionality that allows other software modules to perform tasks more easily than to interface directly with the underlying operating system 914 functionality (e.g., kernel 928, services 930, drivers 932, and/or modules 960-962). Libraries 916 may include system libraries 934 (e.g., C standard library) that may provide functions such as memory allocation functions, string manipulation functions, mathematic functions, and the like. Also, libraries 916 may include API libraries 936 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. Libraries 916 may also include a wide variety of other libraries 938 to provide many other APIs to the applications 920 and other software components/modules.

The frameworks/middleware 918 (also sometimes referred to as middleware) may provide a higher-level common infrastructure that may be utilized by the applications 920 and/or other software components/modules. For example, the frameworks/middleware 918 may provide various graphic user interface (GUI) functions, high-level resource management, high-level location services, and so forth. The frameworks/middleware 918 may provide a broad spectrum of other APIs that may be utilized by the applications 920 and/or other software components/modules, some of which may be specific to a particular operating system 914 or platform.

The applications 920 include built-in applications 940 and/or third-party applications 942. Examples of representative built-in applications 940 may include but are not limited to, a contacts application, a browser application, a book reader application, a location application, a media application, a messaging application, and/or a game application. Third-party applications 942 may include any of the built-in applications 940 as well as a broad assortment of other applications. In a specific example, the third-party application 942 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 942 may invoke the API calls 924 provided by the mobile operating system such as operating system 914 to facilitate functionality described herein.

The applications 920 may utilize built-in operating system functions (e.g., kernel 928, services 930, drivers 932, and/or modules 960-962), libraries (e.g., system libraries 934, API libraries 936, and other libraries 938), and frameworks/middleware 918 to create user interfaces to interact with users of the system. Alternatively, or additionally, in some systems, interactions with a user may occur through a presentation layer, such as presentation layer 944. In these systems, the application/module "logic" can be separated from the aspects of the application/module that interact with a user.

Some software architectures utilize virtual machines. In the example of FIG. 9, this is illustrated by virtual machine 948. A virtual machine creates a software environment where applications/modules can execute as if they were executing on a hardware machine (such as the device 1000 of FIG. 10, for example). A virtual machine 948 is hosted by a host operating system (operating system 914 in FIG. 9) and typically, although not always, has a virtual machine monitor 946, which manages the operation of the virtual machine 948 as well as the interface with the host operating system (i.e., operating system 914). A software architecture 902 executes within the virtual machine 948 such as an operating system 950, libraries 952, frameworks/middleware 954, applications 956, and/or presentation layer 958. These layers of software architecture executing within the virtual machine 948 can be the same as corresponding layers previously described or may be different.

Figure 10:
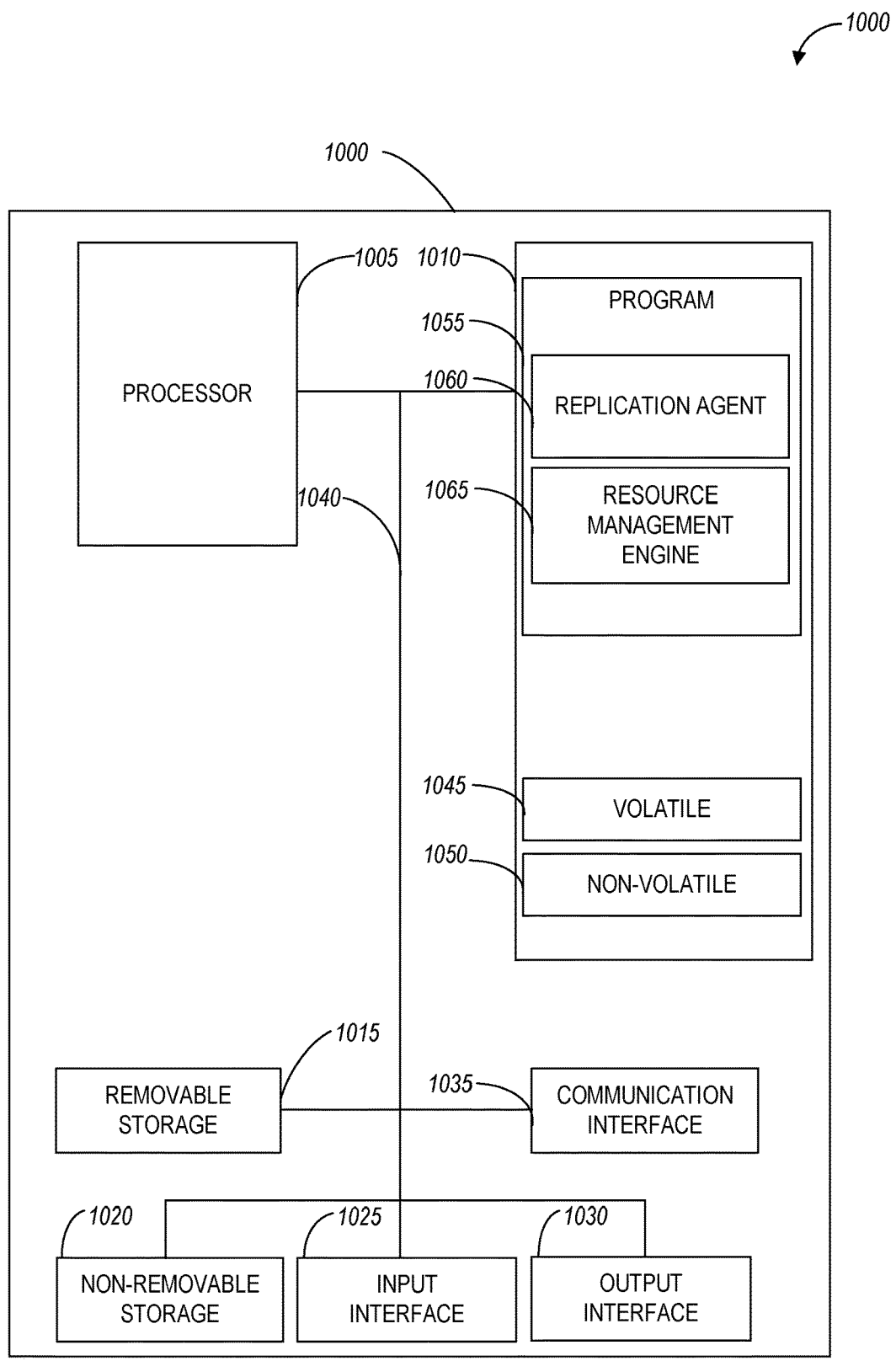
FIG. 10 is a block diagram illustrating circuitry for a device that implements algorithms and performs methods, according to some example embodiments.

FIG. 10 is a block diagram illustrating circuitry for a device that implements algorithms and performs methods, according to some example embodiments. All components need not be used in various embodiments. For example, clients, servers, and cloud-based network devices may each use a different set of components, or in the case of servers, larger storage devices.

One example computing device in the form of a computer 1000 (also referred to as computing device 1000, computer system 1000, or computer 1000) may include a processor 1005, memory 1010, removable storage 1015, non-removable storage 1020, input interface 1025, output interface 1030, and communication interface 1035, all connected by a bus 1040. Although the example computing device is illustrated and described as the computer 1000, the computing device may be in different forms in different embodiments.

The memory 1010 may include volatile memory 1045 and non-volatile memory 1050 and may store a program 1055. The computer 1000 may include—or have access to a computing environment that includes—a variety of computer-readable media, such as the volatile memory 1045, the non-volatile memory 1050, the removable storage 1015, and the non-removable storage 1020. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

Computer-readable instructions stored on a computer-readable medium (e.g., the program 1055 stored in the memory 1010) are executable by the processor 1005 of the computer 1000. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example. As used herein, the terms "computer-readable medium" and "machine-readable medium" are interchangeable.

Program 1055 may utilize a customer preference structure using modules discussed herein, such as a replication agent 1060 and the resource management engine 1065. The replication agent 1060 and the resource management engine 1065 may be the same as the replication agent 406 and the resource management engine 426, respectively, as discussed in connection with at least FIG. 4.

Any one or more of the modules described herein may be implemented using hardware (e.g., a processor of a machine, an application-specific integrated circuit (ASIC), field-programmable gate array (FPGA), or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

In some aspects, one or more of the modules 1060-1065 can be integrated as a single module, performing the corresponding functions of the integrated modules.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

It should be further understood that software including one or more computer-executable instructions that facilitate processing and operations as described above concerning any one or all of the steps of the disclosure can be installed in and sold with one or more computing devices consistent with the disclosure. Alternatively, the software can be obtained and loaded into one or more computing devices, including obtaining the software through a physical medium or distribution system, including, for example, from a server owned by the software creator or from a server not owned but used by the software creator. The software can be stored on a server for distribution over the Internet, for example.

Also, it will be understood by one skilled in the art that this disclosure is not limited in its application to the details of construction and the arrangement of components outlined in the description or illustrated in the drawings. The embodiments herein are capable of other embodiments and capable of being practiced or carried out in various ways. Also, it will be understood that the phraseology and terminology used herein are for description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. Also, the terms "connected" and "coupled" and variations thereof are not restricted to physical or mechanical connections or couplings. Further, terms such as up, down, bottom, and top are relative, and are employed to aid illustration, but are not limiting.

The components of the illustrative devices, systems, and methods employed in accordance with the illustrated embodiments can be implemented, at least in part, in digital electronic circuitry, analog electronic circuitry, or computer hardware, firmware, software, or in combinations of them. These components can be implemented, for example, as a computer program product such as a computer program, program code or computer instructions tangibly embodied in an information carrier, or a machine-readable storage device, for execution by, or to control the operation of, data processing apparatus such as a programmable processor, a computer, or multiple computers.

A computer program can be written in any form of programming language, including compiled or interpreted languages, and it can be deployed in any form, including as a stand-alone program or as a module, component, subroutine, or other units suitable for use in a computing environment. A computer program can be deployed to be executed on one computer or multiple computers at one site or distributed across multiple sites and interconnected by a communication network. Also, functional programs, codes, and code segments for accomplishing the techniques described herein can be easily construed as within the scope of the claims by programmers skilled in the art to which the techniques described herein pertain. Method steps associated with the illustrative embodiments can be performed by one or more programmable processors executing a computer program, code, or instructions to perform functions (e.g., by operating on input data and/or generating an output). Method steps can also be performed by, and apparatus for performing the methods can be implemented as, special purpose logic circuitry, e.g., an FPGA (field-programmable gate array) or an ASIC (application-specific integrated circuit), for example.

The various illustrative logical blocks, modules, and circuits described in connection with the embodiments disclosed herein may be implemented or performed with a general-purpose processor, a digital signal processor (DSP), an ASIC, an FPGA or other programmable logic device, discrete gate, or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random-access memory, or both. The required elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, and CD-ROM and DVD-ROM disks). The processor and the memory can be supplemented by, or incorporated in special purpose logic circuitry.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

As used herein, "machine-readable medium" (or "computer-readable medium") means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store processor instructions. The term "machine-readable medium" shall also be taken to include any medium or combination of multiple media, that is capable of storing instructions for execution by one or more processors 1005, such that the instructions, when executed by one or more processors 1005, cause the one or more processors 1005 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" as used herein excludes signals per se.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Although the present disclosure has been described with reference to specific features and embodiments thereof, it is evident that various modifications and combinations can be made thereto without departing from the scope of the disclosure. For example, other components may be added to, or removed from, the described systems. The specification and drawings are, accordingly, to be regarded simply as an illustration of the disclosure as defined by the appended claims, and are contemplated to cover any modifications, variations, combinations, or equivalents that fall within the scope of the present disclosure. Other aspects may be within the scope of the following claims.

What is claimed is:

1. A computer-implemented method for on-demand data replication in a network architecture, the method comprising:
   activating an on-demand program to pair a network-based replication agent with a data source, based on a pairing request originating from the data source;
   allocating compute resources of the network architecture for the network-based replication agent based on a hint received from the data source, the hint indicative of at least a size of an upcoming data traffic transmission from the data source, the hint received from the data source prior to the data traffic transmission;
   in response to receiving data from the data traffic transmission, activating the network-based replication agent via the on-demand program to replicate the received data using the allocated compute resources; and
   releasing the allocated compute resources upon completion of data replication of the received data.

2. The computer-implemented method according to claim 1, wherein the on-demand program is a serverless function configured to activate the network-based replication agent on demand, in response to receiving the data from the data traffic transmission.

3. The computer-implemented method according to claim 1, wherein the hint is indicative of at least one of a start-of-data cycle indicator, an end-of-data cycle indicator, and a number of bytes within the upcoming data traffic transmission.

4. The computer-implemented method according to claim 1, wherein the allocating of the compute resources of the network architecture is further based on one or both of historical resource usage by the network-based replication agent and pricing information for usage of the compute resources.

5. The computer-implemented method according to claim 1, wherein the hint includes a start-of-cycle hint comprising a start cycle indicator for the upcoming data traffic transmission.

6. The computer-implemented method according to claim 5, further comprising:
   receiving an end-of-cycle hint from the data source, the end-of-cycle hint comprising an end cycle indicator of a data cycle concluding the data traffic transmission; and
   releasing the allocated compute resources based on the end cycle indicator.

7. The computer-implemented method according to claim 1, wherein the allocating of the compute resources further comprises:
   allocating one or more of central processing unit (CPU) resources, disk space resources, and memory resources available within the network architecture to the network-based replication agent based on the hint.

8. The computer-implemented method according to claim 7, further comprising:
   receiving another hint subsequent to receiving data for a first portion of the data traffic transmission, the another hint indicative of a size of data for an upcoming second portion of the data traffic transmission.

9. The computer-implemented method according to claim 8, further comprising:
   dynamically adjusting the allocated one or more of CPU resources, disk space resources, and memory resources based on the another hint indicative of the size of data for the upcoming second portion of the data traffic transmission.

10. A system comprising:
   a memory that stores instructions; and
   one or more processors in communication with the memory, wherein the one or more processors execute the instructions to:
      activate an on-demand program to pair a network-based replication agent with a data source, based on a pairing request originating from the data source;
      allocate compute resources for the network-based replication agent based on a hint received from the data source, the hint indicative of at least a size of an upcoming data traffic transmission from the data source, the hint received from the data source prior to the data traffic transmission;
      in response to receiving data from the data traffic transmission, activate the network-based replication agent via the on-demand program to replicate the received data using the allocated compute resources; and release the allocated compute resources upon completion of data replication of the received data.

11. The system according to claim 10, wherein the on-demand program is a serverless function configured to activate the network-based replication agent on demand, upon receiving the data from the data traffic transmission.

12. The system according to claim 10, wherein the hint is indicative of at least one of a start-of-data cycle indicator, an end-of-data cycle indicator, and a number of bytes within the upcoming data traffic transmission.

13. The system according to claim 10, wherein allocating the compute resources is further based on one or both of historical resource usage by the network-based replication agent and pricing information for usage of the compute resources.

14. The system according to claim 10, wherein the hint includes a start-of-cycle hint comprising a start cycle indicator for the upcoming data traffic transmission.

15. The system according to claim 14, wherein the one or more processors execute the instructions to:
  receive an end-of-cycle hint from the data source, the end-of-cycle hint comprising an end cycle indicator of a data cycle concluding the data traffic transmission; and
  release the allocated compute resources based on the end cycle indicator.

16. The system according to claim 10, wherein to allocate the compute resources, the one or more processors execute the instructions to:
  allocate one or more of central processing unit (CPU) resources, disk space resources, and memory resources for the network-based replication agent based on the hint.

17. The system according to claim 16, wherein the one or more processors execute the instructions to:
  receive another hint subsequent to receiving data for a first portion of the data traffic transmission, the another hint indicative of a size of data for an upcoming second portion of the data traffic transmission.

18. The system according to claim 17, wherein the one or more processors execute the instructions to:
  dynamically adjust the allocated one or more of CPU resources, disk space resources, and memory resources based on the another hint indicative of the size of data for the upcoming second portion of the data traffic transmission.

19. A non-transitory computer-readable medium storing instructions for on-demand data replication in a network architecture, that when executed by one or more processors, cause the one or more processors to perform operations comprising:
  activating an on-demand program to pair a network-based replication agent with a data source, based on a pairing request originating from the data source;
  allocating compute resources for the network-based replication agent based on a hint received from the data source, the hint indicative of at least a size of an upcoming data traffic transmission from the data source, the hint received from the data source prior to the data traffic transmission;
  upon receiving data from the data traffic transmission, activating the network-based replication agent via the on-demand program to replicate the received data using the allocated compute resources; and
  releasing the allocated compute resources upon completion of data replication of the received data.

20. The non-transitory computer-readable medium of claim 19, wherein upon execution, the instructions further cause the one or more processors to perform operations comprising:
  allocating one or more of central processing unit (CPU) resources, disk space resources, and memory resources for the network-based replication agent based on the hint;
  receiving at least another hint subsequent to receiving data for a first portion of the data traffic transmission, the another hint indicative of a size of data for an upcoming second portion of the data traffic transmission; and
  dynamically adjusting the allocated one or more of CPU resources, disk space resources, and memory resources based on the at least another hint indicative of the size of data for the upcoming second portion of the data traffic transmission.

* * * * *